(12) United States Patent  
Feld

(10) Patent No.: US 9,400,014 B2
(45) Date of Patent: Jul. 26, 2016

(54) ROTATING ASSEMBLY FOR MACHINE

(71) Applicant: Caterpillar Global Mining LLC, South Milwaukee, WI (US)

(72) Inventor: Gregory N. Feld, Franklin, WI (US)

(73) Assignee: Caterpillar Global Mining LLC, South Milwaukee, WI (US)

( * ) Notice: Subject to any disclaimer, the term of this patent is extended or adjusted under 35 U.S.C. 154(b) by 105 days.

(21) Appl. No.: 14/228,743

(22) Filed: Mar. 28, 2014

(65) Prior Publication Data

US 2015/0275972 A1 Oct. 1, 2015

(51) Int. Cl.
*F16C 33/60* (2006.01)
*F16C 19/36* (2006.01)
*F16C 33/36* (2006.01)
*E02F 3/48* (2006.01)
*E02F 9/12* (2006.01)

(52) U.S. Cl.
CPC . *F16C 33/60* (2013.01); *E02F 3/48* (2013.01); *E02F 9/12* (2013.01); *F16C 19/364* (2013.01); *F16C 33/605* (2013.01)

(58) Field of Classification Search
CPC ........ F16C 33/60; F16C 19/364; F16C 27/08; F16C 41/02; F16C 33/526; F16C 2300/14; F16C 2350/26; E02F 9/12; E02F 3/48; E02F 9/121; B66C 23/84
USPC ......... 384/564, 569, 571, 593, 618, 620, 621, 384/623, 570, 622; 29/898.07
See application file for complete search history.

(56) References Cited

U.S. PATENT DOCUMENTS

| | | | | |
|---|---|---|---|---|
| 631,394 A * | 8/1899 | Bradshaw | ............... | F16C 19/30 384/593 |
| 3,985,406 A * | 10/1976 | Baron | ................... | F16C 33/526 212/253 |
| 4,239,305 A | 12/1980 | Baron | | |
| 4,329,795 A | 5/1982 | Kalve | | |
| 4,371,086 A * | 2/1983 | Sankey | ................... | F16C 33/76 384/110 |
| 4,582,436 A | 4/1986 | Merron | | |
| 4,611,440 A * | 9/1986 | Kalve | ...................... | E02F 9/121 414/744.2 |
| 4,622,860 A * | 11/1986 | Cametti | ................... | E02F 9/121 384/621 |
| 4,723,852 A * | 2/1988 | Ehret | ...................... | F16C 27/08 29/898.07 |
| 4,769,932 A * | 9/1988 | Kalve | ........................ | E02F 3/46 212/175 |
| 5,058,753 A * | 10/1991 | Malik | ...................... | E02F 9/121 212/245 |
| 5,121,561 A * | 6/1992 | Palfreyman | ............... | E02F 3/58 384/593 |
| 5,205,384 A | 4/1993 | Heshmat | | |
| 5,205,657 A * | 4/1993 | Feld | ...................... | F16C 33/526 384/623 |
| 5,333,510 A * | 8/1994 | Anderson | ............. | G01L 5/0009 73/862.381 |
| 5,676,471 A | 10/1997 | Kallenberger et al. | | |
| 7,572,062 B2 | 8/2009 | Morawski et al. | | |
| 7,891,508 B2 * | 2/2011 | Delago | ................... | F16C 19/50 212/253 |
| 8,573,852 B2 | 11/2013 | Knuth | | |
| 2012/0121215 A1 | 5/2012 | Knuth | | |

FOREIGN PATENT DOCUMENTS

WO 2013097080 A1 7/2013

* cited by examiner

Primary Examiner — Marcus Charles

(57) ABSTRACT

A rail segment for a rotating assembly of a machine is provided. The rail segment includes a first surface configured to face a support structure of the machine. The rail segment further includes a second surface configured to face a roller of the rotating assembly. The second surface includes an arcuate shape along a circumferential direction with respect to a rotation axis of the rotating assembly. Furthermore, the second surface is substantially parallel along a radial direction with respect to the rotation axis of the rotating assembly.

18 Claims, 4 Drawing Sheets

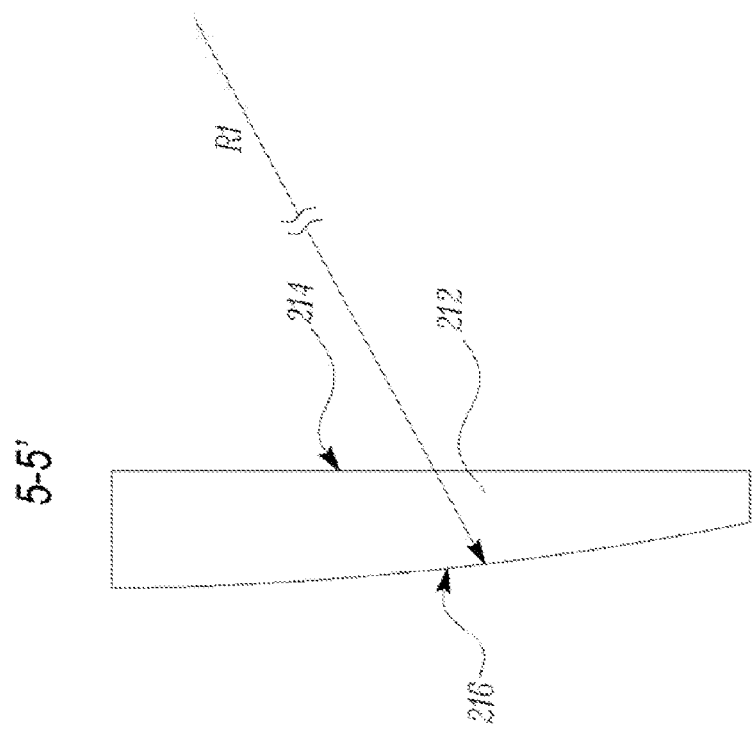
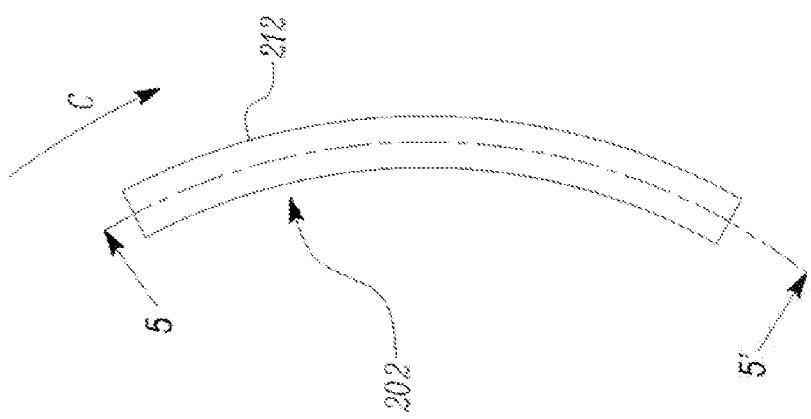
FIG. 4
FIG. 5

ROTATING ASSEMBLY FOR MACHINE

TECHNICAL FIELD

The present disclosure relates to a rotating assembly for a machine having relatively rotatable structures.

BACKGROUND

Machines, such as dragline excavators, mining shovels, hydraulic excavators, and the like, typically include two structures that are rotatable relative to one another. A rotating assembly is provided between the two rotatable structures to enable rotation between them. The loads acting on the rotating assembly may be unevenly distributed about a center of rotation, thereby resulting in points of stress concentration across the rotating assembly. This may result in points of peak loading which shift about the center of rotation as the structures rotate with respect to each other. The loads imposed on the rotating assembly, results result in uneven, constantly shifting weight distribution which may lead to damage of the rotating assembly.

U.S. Pat. No. 5,676,471 discloses an apparatus comprising a lower support structure having an upper surface, a circular lower rail which is mounted on the upper surface of the lower support structure and which is centered on a generally vertical axis. The apparatus further comprises the upper structure having a lower surface, a circular upper rail which is mounted on the lower surface of the upper structure and which is centered on the axis, a plurality of rollers which are located between the upper and lower rails and which support the upper structure for rotation relative to the lower structure about the axis. The rollers are rotatable about respective generally horizontal axis intersecting the vertical axis at a common point. Further, the apparatus includes one of the rails including an inwardly facing surface defining a portion of a sphere centered on the point, and each of the rollers including an outwardly facing surface which engages the inwardly facing surface and which defines a portion of a sphere centered on the point.

SUMMARY

In one aspect of the present disclosure, a rail segment for a rotating assembly of a machine is provided. The rail segment includes a first surface configured to face a support structure of the machine. The rail segment further includes a second surface configured to face a roller of the rotating assembly. The second surface includes an arcuate shape along a circumferential direction with respect to a rotation axis of the rotating assembly. Furthermore, the second surface is substantially parallel along a radial direction with respect to the rotation axis of the rotating assembly.

In another aspect of the present disclosure, a rotating assembly for a machine is provided. The rotating assembly includes an upper rail, a lower rail and a plurality of rollers. The upper rail is coupled to a first support structure of the machine. The lower rail is coupled to a second support structure of the machine. The plurality of rollers is disposed between the upper rail and the lower rail. The plurality of rollers is configured to facilitate relative rotation between the upper rail and the lower rail about a rotation axis. The upper rail includes a plurality of upper rail segments. Each of the plurality of upper rail segments includes an upper surface facing the first support structure and a lower surface facing one or more of the plurality of rollers. The lower surface of at least one of the plurality of upper rail segments has an arcuate shape along a circumferential direction with respect to the rotation axis.

In another aspect of the present disclosure, a rotating assembly for a machine is provided. The rotating assembly includes an upper rail, a lower rail and a plurality of rollers. The upper rail is coupled to a first support structure of the machine. The lower rail is coupled to a second support structure of the machine. The plurality of rollers is disposed between the upper rail and the lower rail. The plurality of rollers is configured to facilitate relative rotation between the upper rail and the lower rail about a rotation axis. The upper rail includes a plurality of upper rail segments. Each of the plurality of upper rail segments includes an upper surface facing the first support structure and a lower surface facing one or more of the plurality of rollers. The lower rail includes a plurality of lower rail segments, each of the plurality of lower rail segments having an upper surface facing the one or more of the plurality of rollers and a lower surface facing the second support structure. The lower surface of at least one of the plurality of upper rail segments has an arcuate shape along a circumferential direction with respect to the rotation axis. The upper surface of each of the plurality of lower rail segments is tapered along a radial direction with respect to the rotation axis.

Other features and aspects of this disclosure will be apparent from the following description and the accompanying drawings.

BRIEF DESCRIPTION OF THE DRAWINGS

FIG. 4 illustrates one of an exemplary upper rail segment, according to an embodiment of the present disclosure; and FIG. 5 illustrates a cross-sectional view of the upper rail segment taken along an axis A-A' of FIG. 4.

DETAILED DESCRIPTION

Figure 1:
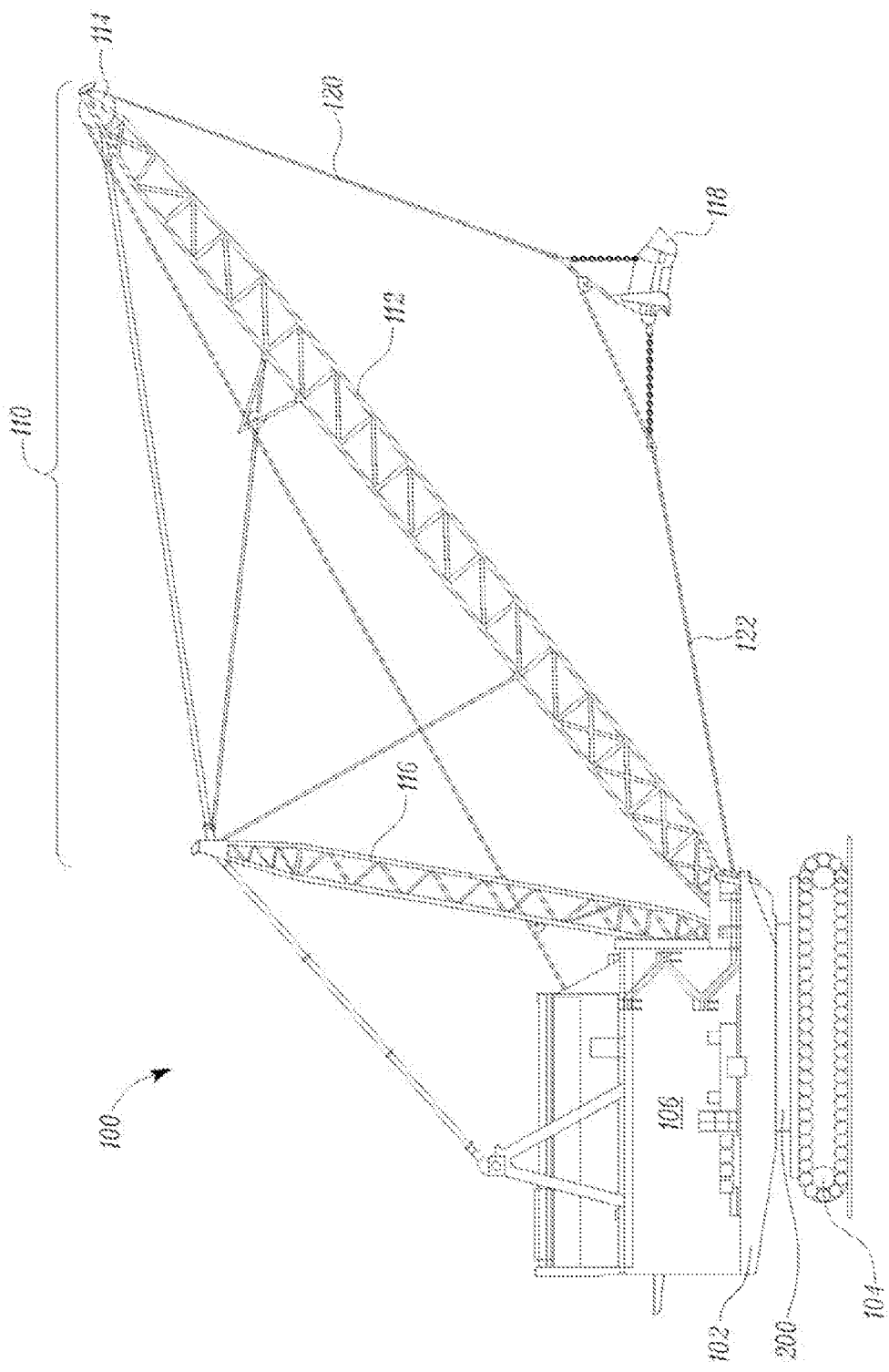
FIG. 1 illustrates a side elevation view of an exemplary machine, according to an embodiment of the present disclosure.

The present disclosure relates to a rotating assembly for a machine having relatively rotatable structures. FIG. 1 illustrates a side elevation view of an exemplary machine 100, according to an embodiment of the present disclosure. The machine 100 is embodied as a dragline excavator. In various other embodiments, the machine 100 may be any machine having two or more relatively rotatable structures, such as a hydraulic excavator, mine shovel, or any other earthmoving machine known in the art.

The machine 100 includes a frame 102 rotatably supported on a set of ground engaging members 104 used to support the machine 100. In an exemplary embodiment, the ground engaging members 104 are lower works, hereinafter referred to as the lower works 104. Though the lower works 104 is illustrated as tracks in FIG. 1, in various other embodiments, the machine 100 may be supported by a stationary base (not shown) or wheels (not shown). The machine 100 includes a machinery house 106 supported on the frame 102. In an embodiment, the machinery house 106 may include an onboard power source (not shown) that provides power to the lower works 104 and an implement system 110 of the machine 100. In an alternative embodiment, the power source may be remotely located and provides power to the machine 100 via a power cable.

As shown in FIG. 1, the implement system 110 includes a boom member 112 extending upwardly and outwardly from the frame 102. The boom member 112 includes a sheave 114 provided at a distal end. The boom member 112 is supported relative to the frame 102 by using a supporting structure 116, such as a mast. Further, the machine 100 includes a bucket 118. A hoist rope 120 extends between the boom member 112 and the bucket 118, and over the sheave 114 for causing vertical movement of the bucket 118. Further, the machine 100 includes a drag rope 122 extending between the frame 102 and the bucket 118 for causing horizontal movement of the bucket 118.

The machine 100 further includes a rotating assembly 200 positioned between the frame 102 and the lower works 104. The rotating assembly 200 is configured to rotatably support the frame 102 on the lower works 104. The rotating assembly 200 is explained in greater detail in conjunction with FIGS. 2 to 5.

Figure 2:
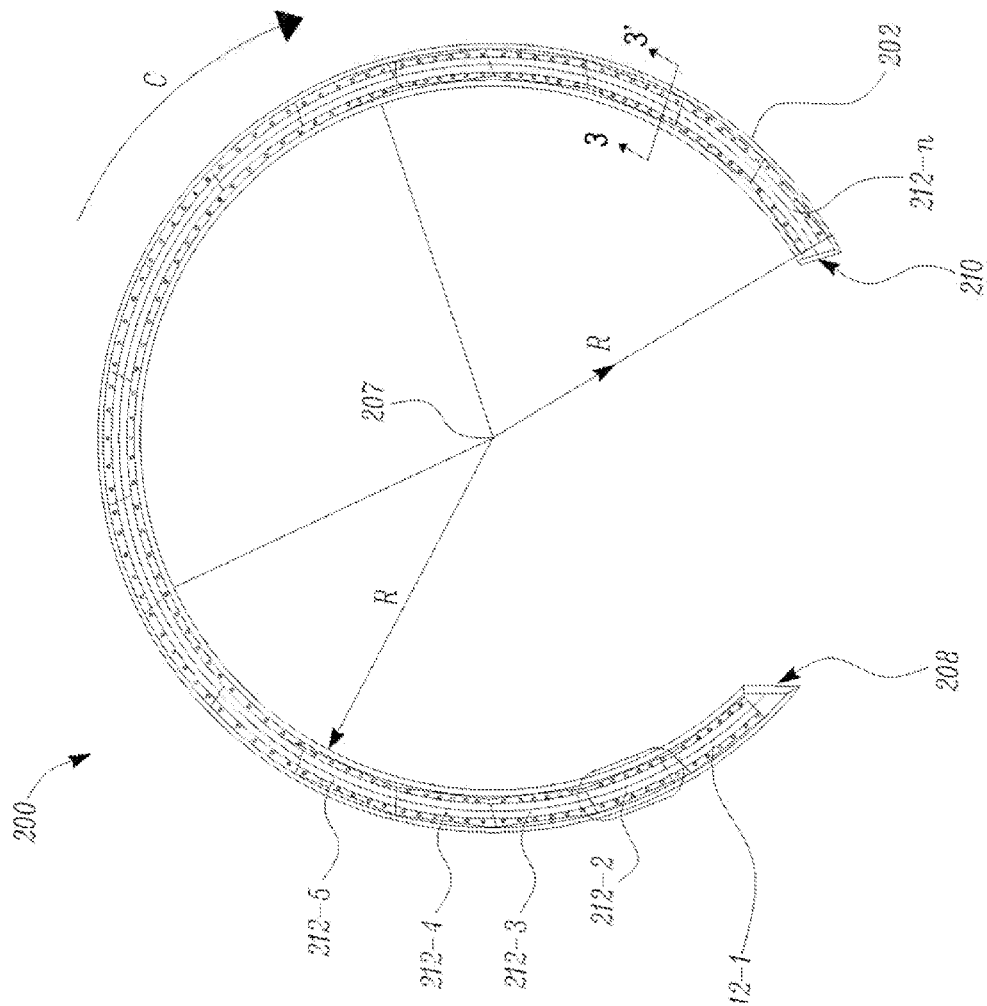
FIG. 2 illustrates a top view of a rotating assembly for the machine of FIG. 1, according to an embodiment of the present disclosure.
Figure 3:
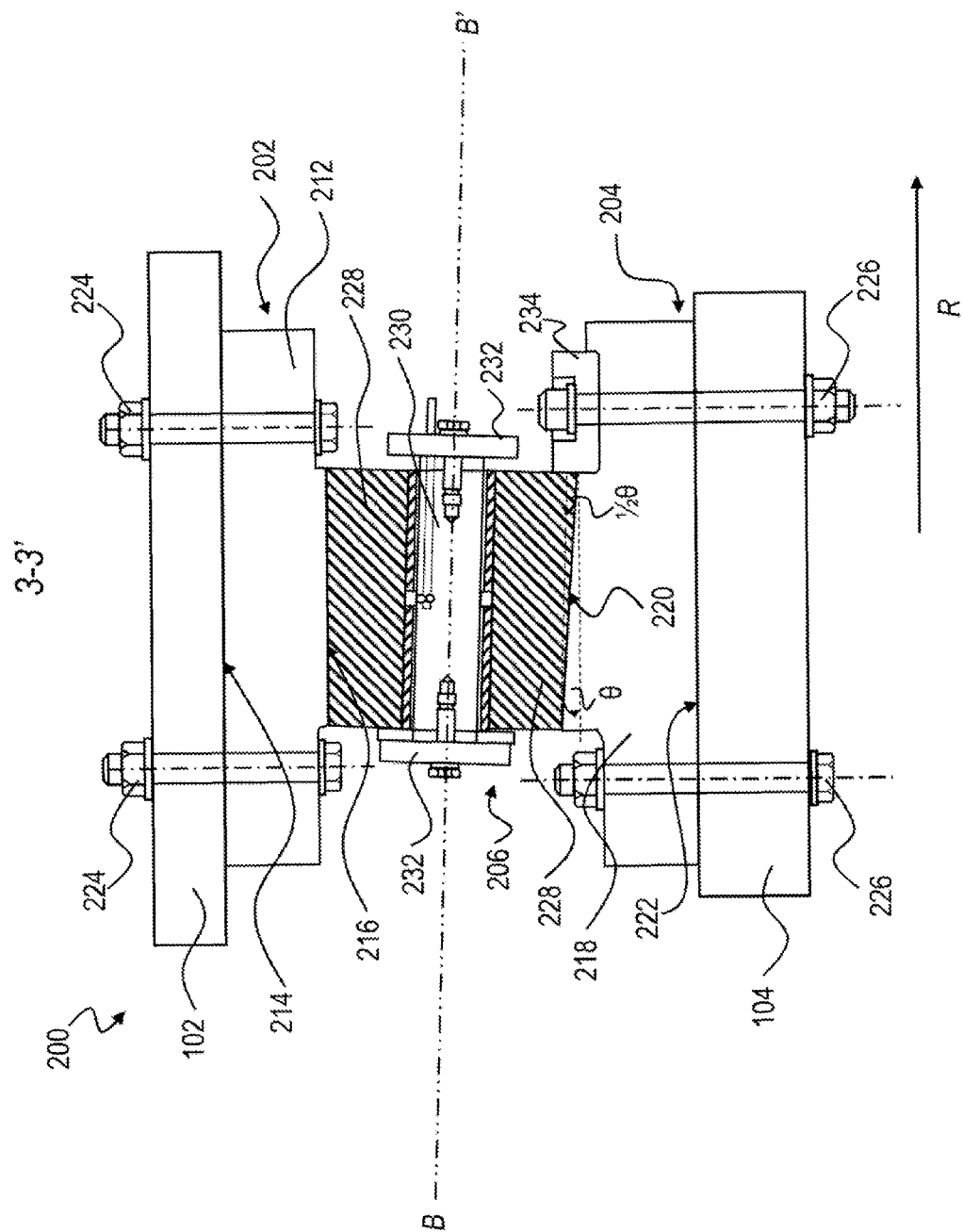
FIG. 3 illustrates a cross-sectional view of the rotating assembly taken along an axis I-I' of FIG. 2.

FIG. 2 illustrates a top view of the rotating assembly 200, according to an embodiment of the present disclosure. For the sake of simplicity in explanation, some or many other components of the machine 100 and the rotating assembly 200 are not shown in FIG. 2. FIG. 3 illustrates a cross-sectional view of the rotating assembly 200 taken along an axis 3-3' I-I'. Referring to FIGS. 2 and 3, the rotating assembly 200 includes an upper rail 202, a lower rail 204 and a plurality of rollers 206 (only one shown in FIG. 3) disposed between the upper rail 202 and the lower rail 204. The rollers 206 are configured to facilitate relative rotation between the upper rail 202 and the lower rail 204 about a rotation axis 207 (shown in FIG. 2).

The upper rail 202 is configured to be coupled to a first support structure, which in the present embodiment is the frame 102, of the machine 100. The lower rail 204 is configured to be coupled to a second support structure, which in the present embodiment are the lower works 104, of the machine 100. In an exemplary embodiment, the upper rail 202 has a discontinuous circular shape. For example, as shown in FIG. 2, the upper rail 202 includes a first end 208 and a second end 210. In various other embodiments (not shown), the upper rail 202 may include another angular discontinuity similar to the discontinuity between the first end 208 and the second end 210. Therefore, the upper rail 202 may include more than two ends. Further, the lower rail 204 may have a continuous circular shape extending 360 degrees about the rotation axis 207.

In an exemplary embodiment, the upper rail 202 includes a number of upper rail segments 212-1, 212-2, 212-3 . . . 212-n, collectively referred to as the upper rail segment 212 coupled to each other to form the upper rail 202. Each of the upper rail segments 212 includes a first surface 214, such as an upper surface, and a second surface 216, such as a lower surface. The first surface 214 and the second surface 216 are hereinafter referred to as the upper surface 214 and the lower surface 216, respectively. Similarly, the lower rail 204 includes a number of lower rail segments 218 (only one shown in FIG. 3) coupled to each other to form the lower rail 204. Each of the lower rail segments 218 includes an upper surface 220 and a lower surface 222. In an exemplary embodiment, the upper rail segments 212 is joined to the frame 102 by using bolts 224, and the lower rail segments 218 are joined to the lower works 104 by using bolts 226. In various other embodiments, the upper rail segments 212 and the lower rail segments 218 may be joined to the frame 102 and the lower works 104 respectively, by using any of the known coupling mechanisms, such as welding, etc.

Referring to FIG. 3, the upper rail 202 and the lower rail 204 are rotatably supported on the rollers 206. As shown in FIG. 3, the lower surface 216 of the upper rail segment 212 is configured to face the rollers 206. The upper surface 214 of the upper rail segment 212 is configured to face the frame 102 of the machine 100. Further, the upper surface 220 of the lower rail segment 218 is configured to face the rollers 206, and the lower surface 222 of the lower rail segment 218 is configured to face the lower works 104.

In an exemplary embodiment, the rollers 206 may be tapered roller bearings. With respect to a radial direction "R" which may be parallel to the rotation axis 207, the rollers 206 may be tapered by an angle of ½θ. Each of the rollers 206 includes a rotating member 228 disposed around a roller pin 230, and configured to rotate about a rotation axis B-B' of the roller 206. The rotating member 228 may be retained with respect to the roller pin 230 by using retainers 232, such that the rotating member 228 remain properly aligned about the rotation axis 207. Additionally, the retainers 232 may also maintain a spacing between adjacent rollers 206. Furthermore, the plurality of rollers 206 are retained, in an axial direction, with the upper rail 212 and the lower rail 218 by using a thrust rail 234.

In an exemplary embodiment, the lower surface 216 of the upper rail segment 212 is substantially parallel along a the radial direction "R". Further, the upper surface 220 of the lower rail segment 218 is tapered by an angle θ along the radial direction "R" with respect to the rotation axis 207. It may be contemplated that the radial direction "R" may be along a radius of the rotating assembly 200 with respect to the rotation axis 207.

Furthermore, in an exemplary embodiment of the present disclosure, an angle θ of the tapered upper surface 220 of the lower rail segment 218 is twice an angle ½θ of the tapered surface of the rollers 206. For example, the roller 206 is tapered along the radial direction "R" with respect to the rotation axis 207, and to compensate for the flat lower surface 216 of the upper rail segment 212, the upper surface 220 of the lower rail segment 218 is further tapered twice the angle ½θ of the tapered roller bearings, or θ. In various alternative embodiments (not shown), the lower surface 216 of the upper rail segment 212 may also be tapered along the radial direction "R". Further, an angle ½θ of the taper of the lower surface 216 may be equal to the angle ½θ of the tapered surface of the rollers 206. Similarly, the upper surface 220 of the lower rail segment 218 may also be equal to the angle ½θ of the tapered surface of the rollers 206.

FIG. 4 illustrates a single upper rail segment 212 of the upper rail 202. FIG. 5 illustrates a cross-sectional view of the upper rail segment 212 taken along an axis 5-5' shown in FIG. 4. It may be contemplated that the axis 5-5' may be along a circumferential direction "C" with respect to the rotation axis 207 shown in FIG. 2. It may be contemplated that the circumferential direction "C" may be along a circumference of the rotating assembly 200. The cross section illustrated in FIG. 5 may be taken between the upper surface 214 and the lower surface 216 (shown in FIG. 3) of upper rail segment 212.

Referring now to FIG. 5, the upper surface 214 of the upper rail segment 212 is flat and/or parallel along the circumferential direction "C" with respect to the rotation axis 207 of the rotating assembly 200. In an exemplary embodiment, the lower surface 216 of the upper rail segment 212 has an arcuate shape which varies the thickness between upper surface 214 and lower surface 216 along the circumferential direction "C"

with respect to the rotation axis 207. The arcuate shape may be substantially circular having a large radius of curvature R1. For example, the radius of curvature R1 may be about 1 mile. In an embodiment of the present disclosure, only the upper rail segments 212 located at the first and the second ends 208, 210 of the upper rail 202, may have lower surfaces 216 of the arcuate shape along the circumferential direction "C" with respect to the rotation axis 207. For example, three upper rail segments 212 located at the first end 208 and three upper rail segments 212 located the second end 210, may have the lower surfaces 216 with arcuate shape, and the remaining upper rail segments 212 in the upper rail 202 may include flat lower surfaces 216 along the circumferential direction "C". Moreover, the arcuate shapes of the lower surface 216 of the upper rail segments 212 may be joined so as to form a continuous arc of substantially circular shape having a high radius of curvature.

INDUSTRIAL APPLICABILITY

The industrial applicability of the rotating assembly 200 described herein will be readily appreciated from the foregoing discussion.

Due to the arcuate shape of the lower surface 216 of the upper rail segment 212, there is a continuous circular transition, thereby reducing abrupt flat transition from one rail segment to another which results in uneven load distribution. Further, due to the arcuate shape of the lower surface 216 of the upper rail segment 212, there is a continuous contact of the upper rail segment 212 and the rollers 206, thereby creating a slight clearance which allows a vertical movement of the rotating assembly 200 due to increased loading at the first and the second ends 208, 210 of the upper rail 202. Therefore, the arcuate shape of the lower surface 216 of one or more of the upper rail segment 212 along the circumferential direction "C" may improve load distribution and increase the load bearing capacity of the upper rail 202 and therefore, the rotating assembly 200. Additionally, operating lives of the upper rail segments 212 of the upper rail 202, and therefore the rotating assembly 200 may be increased significantly. The arcuate shape of the lower surface 216 of the upper rail segment 212 along the circumferential direction may be imperceptible to an operator and makes manufacturing of these rail segments easy and cost effective.

The upper rail segment 212 may be applicable to any type of rotating assembly 200 having partial upper rails, i.e., not a complete circular upper rail 202. Therefore, the rotating assembly 200 with the described upper rail 202 and the upper rail segments 212 may be used in any sort of machine having two or more rotatable structures, such as dragline excavator, hydraulic excavator, mining shovel, or any other similar earth moving machine.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A rotating assembly for a machine, the rotating assembly comprising:
    an upper rail coupled to a first support structure of the machine;
    a lower rail coupled to a second support structure of the machine; and
    a plurality of rollers disposed between the upper rail and the lower rail, wherein the plurality of rollers is configured to facilitate relative rotation between the upper rail and the lower rail about a rotation axis;
    wherein the upper rail comprises a plurality of upper rail segments, each of the plurality of upper rail segments comprises an upper surface facing the first support structure, and a lower surface facing one or more of the plurality of rollers; and
    wherein the lower surface of at least one of the plurality of upper rail segments has an arcuate shape in a circumferential cross section which varies the thickness between upper surface and lower surface along a circumferential direction with respect to the rotation axis.

2. The rotating assembly of claim 1, wherein the upper rail comprises a first end and a second end, and wherein the lower surface of at least one of the upper rail segments located at the first end and the second end has the arcuate shape.

3. The rotating assembly of claim 1, wherein the lower surface of the at least one upper rail segment is substantially parallel along a radial direction with respect to the rotation axis.

4. The rotating assembly of claim 1, wherein the arcuate shape of the lower surface of the at least one upper rail segment is substantially circular.

5. The rotating assembly of claim 1, wherein the lower rail comprises a plurality of lower rail segments, each of the plurality of lower rail segments having an upper surface facing the one or more of the plurality of rollers and a lower surface facing the second support structure, and wherein the upper surface of the lower rail segments is tapered along a radial direction with respect to the rotation axis.

6. The rotating assembly of claim 1, wherein each of the plurality of rollers is a tapered roller bearing.

7. The rotating assembly of claim 6, wherein an angle of the taper of the upper surface of the lower rail segments is twice an angle of the tapered roller bearing.

8. The rotating assembly of claim 6, wherein an angle of the taper of the upper surface of the lower rail segments is equal to an angle of the tapered roller bearing.

9. The rotating assembly of claim 8, wherein the lower surface of the upper rail segments is tapered along a radial direction with respect to the rotation axis, and wherein an angle of the taper of the lower surface is equal to the angle of the tapered roller bearing.

10. The rotating assembly of claim 1, wherein the machine is one of a dragline excavator, mining shovel and a hydraulic excavator.

11. A rotating assembly for a machine, the rotating assembly comprising:
    an upper rail coupled to a first support structure of the machine;
    a lower rail coupled to a second support structure of the machine; and
    a plurality of rollers disposed between the upper rail and the lower rail, wherein the plurality of rollers is configured to facilitate relative rotation between the upper rail and the lower rail about a rotation axis;
    wherein the upper rail comprises a plurality of upper rail segments, each of the plurality of upper rail segments comprises an upper surface facing the first support structure and a lower surface facing one or more of the plurality of rollers;
    wherein the lower rail comprises a plurality of lower rail segments, each of the plurality of lower rail segments having an upper surface facing the one or more of the plurality of rollers and a lower surface facing the second support structure;

wherein the lower surface of at least one of the plurality of upper rail segments has an arcuate shape in a circumferential cross section which varies the thickness between upper surface and lower surface along a circumferential direction with respect to the rotation axis; and wherein the upper surface of each of the plurality of lower rail segments is tapered along a radial direction with respect to the rotation axis.

12. The rotating assembly of claim 11, wherein the upper rail comprises a first end and a second end, and wherein the lower surface of at least one of the upper rail segments located at the first end and the second end has the arcuate shape.

13. The rotating assembly of claim 11, wherein the lower surface of the at least one upper rail segment is substantially parallel along a radial direction with respect to the rotation axis.

14. The rotating assembly of claim 11, wherein the arcuate shape of the lower surface of the at least one upper rail segment is substantially circular.

15. The rotating assembly of claim 11, wherein each of the plurality of rollers is a tapered roller bearing.

16. The rotating assembly of claim 15, wherein an angle of the taper of the upper surface of the lower rail segments is twice an angle of the tapered roller bearing.

17. The rotating assembly of claim 15, wherein an angle of the taper of the upper surface of the lower rail segments is equal to an angle of the tapered roller bearing.

18. The rotating assembly of claim 17, wherein the lower surface of the upper rail segments is tapered along a radial direction with respect to the rotation axis, and wherein an angle of the taper of the lower surface is equal to the angle of the tapered roller bearing.

* * * * *